April 26, 1966 P. W. WADSWORTH 3,248,486

LINE SWITCHING EQUIPMENT FOR SWITCHBOARDS

Filed Dec. 10, 1962 4 Sheets-Sheet 1

INVENTOR
P. W. WADSWORTH
BY Donald M Duft
ATTORNEY

April 26, 1966 P. W. WADSWORTH 3,248,486

LINE SWITCHING EQUIPMENT FOR SWITCHBOARDS

Filed Dec. 10, 1962 4 Sheets-Sheet 4

United States Patent Office 3,248,486

Patented Apr. 26, 1966

3,248,486

LINE SWITCHING EQUIPMENT FOR SWITCHBOARDS

Paul W. Wadsworth, Massapequa Park, N.Y., assignor to Bell Telephone Laboratories, Incorporated, New York, N.Y., a corporation of New York Filed Dec. 10, 1962, Ser. No. 243,484

21 Claims. (Cl. 179—26)

This invention relates to switching systems and particularly to equipment used in telephone systems for improving customer service and simplifying the tasks performed by operators. The invention more particularly relates to a plural-ended trunk, or line, circuit used by an operator for originating calls from her switchboard position to customer stations through each end of the trunk circuit and for automatically interconnecting each end of the trunk circuit to complete a communication channel between the called stations.

New telephone facilities are continually supplied by the telephone company to fulfill customer demands for newer, better and speedier service at reasonable cost. As a consequence of such demands, definite progress has been attained in improving the service furnished to customers by the switchboard operator. New and imaginative switchboard designs are now available that simplify the operator's tasks and increase her traffic serving capacity. Among the newly developed switchboards are the so-called cordless type which permit an operator to connect her telephone facilities to calling telephone lines and furnish requested services by means of keys and buttons instead of cord circuit facilities.

A deficiency in present day telephone systems utilizing cordless switchboards is that no facilities are provided for permitting an operator to originate calls from cordless switchboards to a plurality of customer stations and then interconnect the stations. Customers frequently request an operator to originate such calls when a customer-dialed call could not be completed because the called party was unavailable or due to a busy condition. As a result, this service must be provided at a manual cord switchboard from which an operator first calls the station requested by the customer and then calls back the requesting customer. After she has contacted the desired parties, the operator manually interconnects the called stations through cord circuit facilities at the switchboard for completing a talking path between the customers. Thereafter, the operator maintains continuous supervision over the calls and withdraws the cord facilities to release the connections when one of the customers disconnects.

To provide this service, present day systems also require a separate communication circuit between the manual switchboard and telephone office for each customer station called by the operator. Each such circuit usually includes long trunk conductors terminated in a jack at the switchboard and a trunk circuit in the telephone office. Thus, two trunks and two trunk circuits are required to establish call connections between two customer stations and the trunks must be interconnected manually with patching cords at the switchboard.

Although such system arrangements are technically reliable and fulfill customer requests for the service, they have proven too complex and costly in light of present trends in switchboard design and customer services including direct distance dialing. Moreover, they require an enormous amount of operator assistance for interconnecting and disconnecting trunks with patching cords. Obviously, these operator efforts are time consuming and tiring tasks which in practice increase the holding time of switching equipment and decrease the operator traffic serving capacity. In addition, the bulky design of manual cord switchboards is yet retained together with its demand for large space in the telephone building.

In view of the foregoing, a general object of this invention is to reduce the cost and complexity of switchboard and telephone office equipments utilized by an operator for originating calls to telephone customers and subsequently interconnecting the customers when priorly requested to do so by one of the customers because, for example, he could not complete a call due ot a busy condition.

A specific object is to simplify the communication circuits used for this service between a switchboard and telephone office for this service between a switchboard and telephone office for calling the customer stations.

Another object is to increase the traffic serving capacity of operators by minimizing the amount of operator effort required for this service, and particularly that effort associated with manually interconnecting and disconnecting communication circuits linking called customer stations to the switchboard.

These and other objects are attained in accordance with an exemplary embodiment of this invention wherein groups of special, two-ended trunk circuits are located at the telephone office together with an allotter circuit which is activated under control of an operator at a cordless switchboard to assign one of the trunk circuits to the operator position at the switchboard. The assigned circuit cooperates with the operator position equipment to activate a position link switch which connects the circuit over a single trunk to the requesting operator position.

Each trunk circuit has first and second appearances, ends, or terminations in the call originating end of the office switching network and facilities selectively controlled by the operator equipment for connecting each appearance over the trunk to her switchboard position. The operator by means of keys sequentially makes a call from each appearance to a different customer station and then activates apparatus in the trunk circuit for automatically interconnecting the appearances to permit communication between called parties. While such communication is in progress, the operator position is connected to the communication circuit for monitoring and supervision purposes. Upon completion of the communication, the trunk circuit detects the disconnect of one of the called parties and notifies the operator of a termination of the call. The operator may thereupon signal the trunk circuit to release the call connections and restore itself to the idle condition.

A salient advantage of my invention is that a single trunk is used between the switchboard and telephone office for providing this service between a plurality of customer stations. This is particularly advantageous from a cost and installation standpoint when the switchboard and office are located in different buildings separated by a great distance. Another advantage is that interconnections between called stations are established automatically and thus the operator is relieved of the task of manually interconnecting lines with patching cords at the switchboard.

A feature of my invention is that a trunk circuit having a plurality of appearances in a switching network receives code signals from operator position equipment and applies them to control facilities which activate the switching network to connect each appearance individually to a communication line and also activate circuitry in the trunk circuit for interconnecting the appearances to provide for communication between the lines connected thereto.

Another feature is that a line circuit having a plurality of lines to a switching network receives code signals from operator position equipment and applies them to control facilities which in turn supply individual control signals through the circuit to each line for activating the switching network to connect each line individually to a communication station and also activate circuitry in the line circuit to provide for communication between the stations.

Another feature is that the line circuit comprises first and second lines and apparatus controlled by the operator position equipment for steering the control signals from the control facilities to each of the lines.

Another feature is that the interconnecting circuitry comprises an electrical coupling network and switch means activated by the control facilities for coupling said first line to said second line through said coupling network.

A specific feature, directly related to the immediately preceding one, is that each of the first and second lines comprises a pair of conductors, the electrical coupling network comprises a pair of capacitors having first and second terminals, and the switch means comprises a pair of interconnecting relays activated by the control facilities for connecting each one of the conductors of the first line individually to a first terminal of one of the capacitors and each one of the conductors of the second line individually to a second terminal of one of the capacitors.

A further feature is that a trunk having two conductors is extended between the operator position equipment and the line circuit and is connected by one of the interconnecting relays to the first line of the line circuit and to the coupling capacitors for providing communication between the operator equipment and the stations connected to the first and second lines.

Still another feature is that the line circuit comprises supervisory means including a pair of polarized relays each one of which is bridged across one of the lines of the circuit under control of one of the interconnecting relays for maintaining established connections between that line and the station connected thereto.

Another feature is that ringback facilities including a potential source, an impedance network and a connector having a timer device are associated with each line of the line circuit and are activated by the operator position equipment for applying timed reringing signals to the lines to recall the associated communication stations.

Another feature is that an operator position at a switchboard is linked over a single trunk to a trunk circuit having a plurality of appearances in a telephone switching network and apparatus selectively controlled over the trunk for conditioning the trunk circuit to make a telephone call over each appearance to a customer station, and that the position equipment transmits the directory code of each customer station over the trunk through the trunk circuit to common control circuits for activating the switching network to connect each appearance to the assigned customer station, and that the control circuits activate apparatus in the trunk circuit for interconnecting the appearances to establish call connections between the called stations.

Still another feature is that the trunk circuit comprises apparatus controlled by the operator position equipment for releasing call connections between a customer station and any one of the appearances and apparatus for reconditioning the trunk circuit to make a telephone call from that appearance to a different customer station while maintaining any established connections from the other appearance to a customer station.

Yet another feature is the provision of a plurality of trunk circuits each of which has first and second appearances in the switching network, a switchboard having a plurality of operator positions, an allotter activated by a request signal from any one of said positions for assigning an idle one of the trunk circuits to the requesting position, a position link operated by the allotter and the requesting position for connecting an assigned trunk circuit to the requesting position, common control circuits responsive to the receipt of directory codes sent from the requesting positions via the assigned circuit for connecting each of the appearances to the designated telephone station, and means in the assigned circuit activated by the control circuits for interconnecting the appearances to provide for communication between the called stations.

The foregoing objects, advantages and features of this invention will be more clearly understood by a reading of the following description of an exemplary embodiment thereof shown in the drawing in which.

Figure 2:
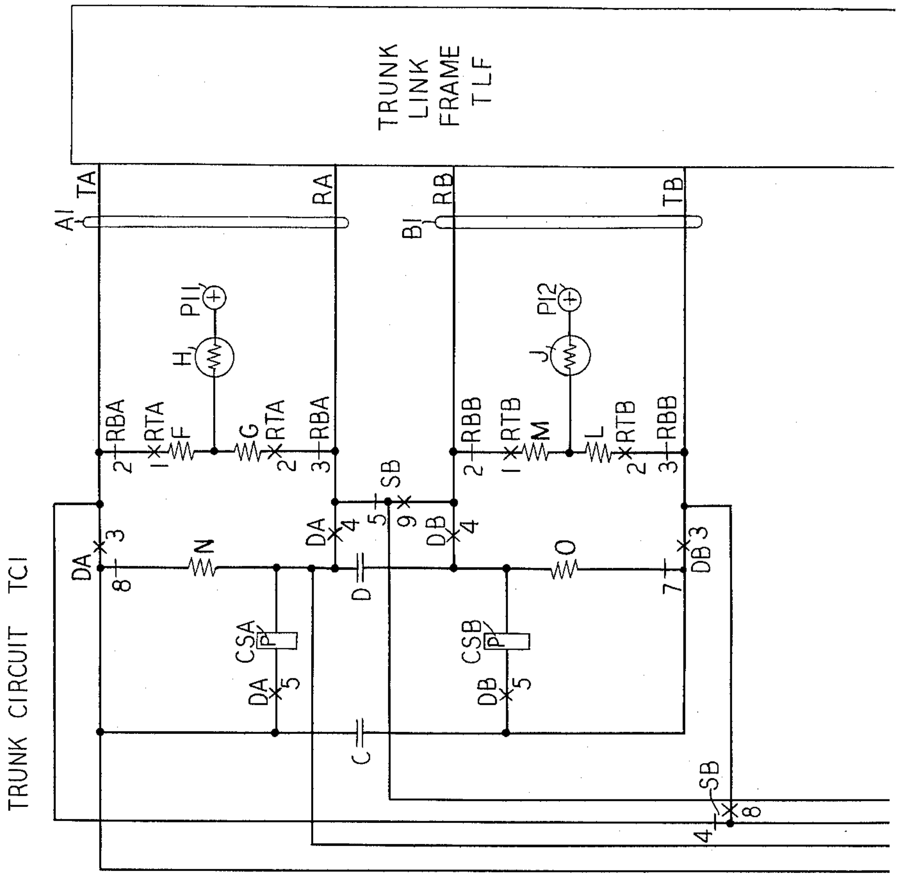
FIGS. 2, 3 and 4 show in schematic detail the apparatus of a trunk circuit associated with an operator position circuit through a position link circuit and, in block diagram form, the allotter circuit associated with a trunk circuit and an operator position circuit.
Figure 3:
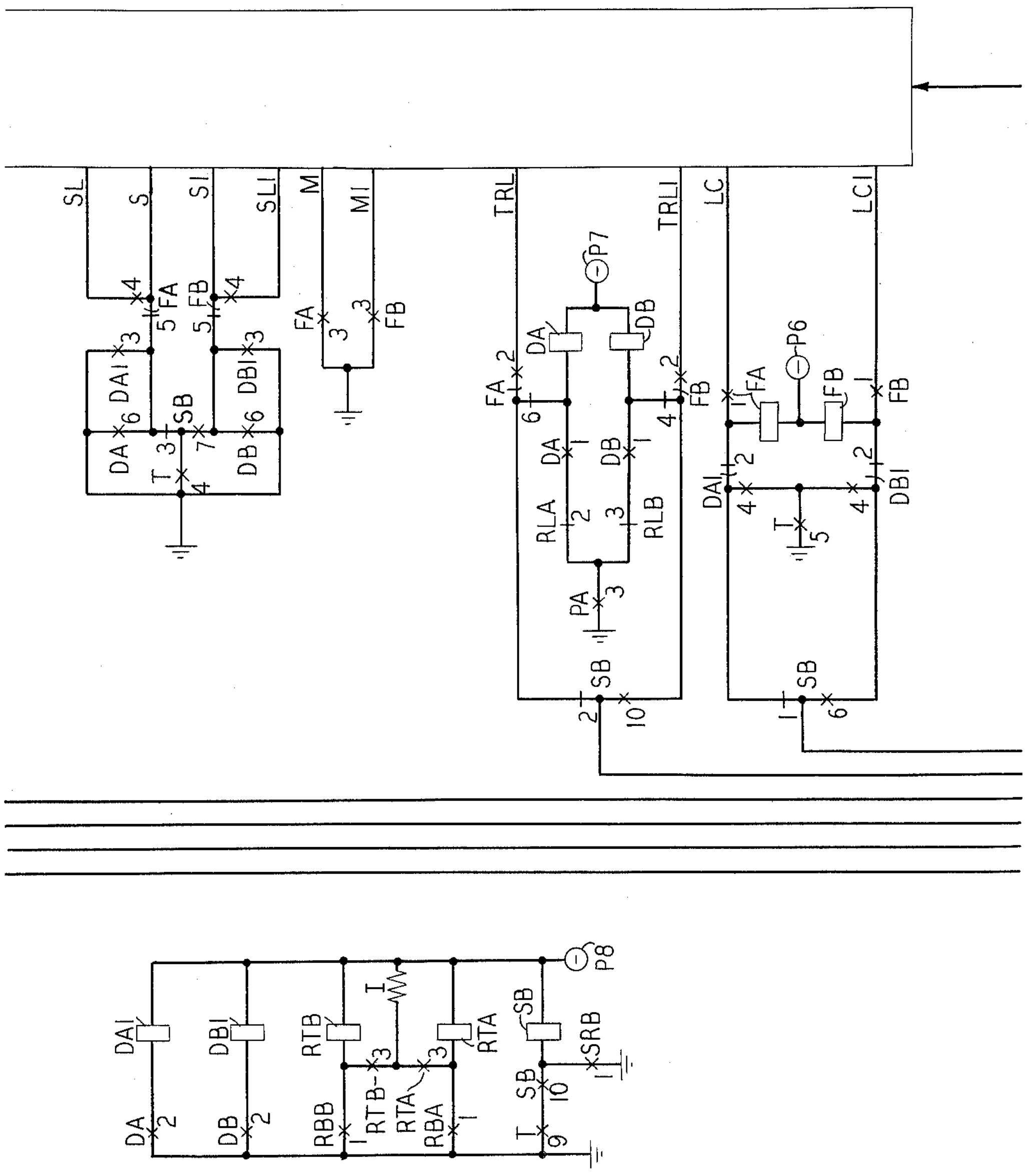
Figure 4:
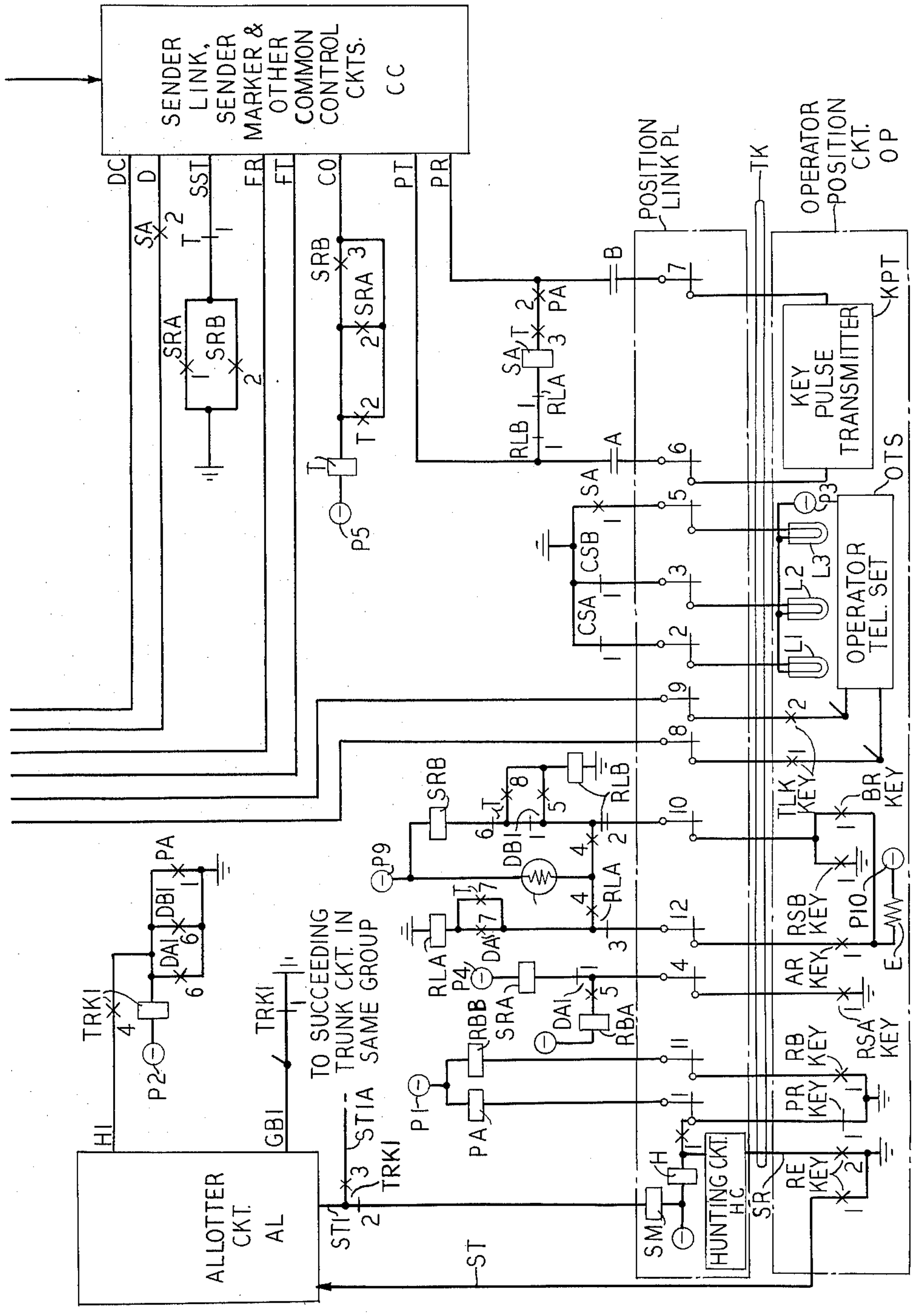

It will be noted that FIGS. 2, 3 and 4 employ a type of notation referred to as "detached-contact" in which an X crossing a line represents a normally opened contact of a relay and a bar crossing a conductor represents a normally closed contact of a relay; "normally" referring to the unoperated condition of a relay. The principles of this type of notation are described in an article entitled "An Improved Detached-Contact-Type Schematic Circuit Drawing" by F. T. Meyer in the September 1955 publication of the American Institute of Electrical Engineers Transaction, Communication and Electronics, vol. 74 at pages 505–513.

The trunk circuit and associated equipment of the present invention may be advantageously incorporated in an automatic telephone system wherein common control circuits are provided to control the establishment of the calls through a switching network to customer stations. One such system is disclosed in R. N. Breed et al., Patent 2,848,543 issued August 19, 1958. The invention is described herein as embodied in a tandem telephone system of the type disclosed in the cited Breed et al. patent for the subject class of operator service is frequently provided at a tandem switching point. It is to be understood, however, that the present invention is not limited to use with a telephone system of this type because it may be utilized with other types of switching systems. Inasmuch as my invention is particularly concerned with the apparatus of the trunk circuit, allotter circuit, position link circuit, and operator position circuit, the other equipment units of the Breed et al. patent are depicted in the drawings in block diagram form. The latter units are neither shown nor described in detail herein except where necessary for a complete understanding of the invention. It is therefore recommended that reference be made to the Breed et al. patent for a complete understanding of the construction of that equipment and of its operation. Allotter AL and position link PL are not disclosed in the latter patent as they are used in the present embodiment and are not disclosed in detail herein because their construction may be similar to circuits well known in the art. For instance, the position link PL may be similar to the crossbar switch operator position link disclosed in the Breed et al patent.

GENERAL DESCRIPTION

The interrelations and functions of the equipment of the exemplary embodiment will now be described with reference to FIG. 1 wherein the trunk circuits TC1–10 are depicted as part of trunk group TG1 of the tandem telephone office. Each trunk circuit, such as circuit TC1, is shown as having a pair of appearances, such as A1 and B1 on the trunk link frame TLF, a link in link group LK to position link circuit PL and a number of control leads extending to the allotter AL and to the sender link, sender and other common control circuits CC. The trunk group TGN is shown in block diagram form and comprises trunk circuits (not shown) as in trunk group TG1. As disclosed in the Breed et al. patent, frame TLF is connected over a number of junctors J to the office link frame OLF. Trunks TK1 and TK2 connect frame OLF to the completing offices CO and CO1 which serve the telephone customer stations C1–4.

When an operator at a switchboard position, such as position OP, desires to originate a call between two customer stations, such as stations C1 and C2, she applies a request signal over lead ST to signal the allotter AL to apply a start signal to one of the leads ST1–N. Allotter AL is arranged to assign trunk circuits in sequence in each of the groups TG1–N. To do so, it receives a signal regarding the busy or idle condition of trunk circuits in each of the groups over leads GB1–N. Assuming now that trunk circuit TC10 is the only idle circuit in group TG1, allotter AL applies a signal to lead ST1 which is in turn directed over lead ST1A to the idle circuit TC10 through the preceding trunk circuits (not shown) which are busy within that group to activate circuit TC10 and assign it to position OP.

After circuit TC10 has been assigned, it activates the position link PL which determines the requesting position and connects the position OP over trunk TK and a link in group LK to circuit TC10. A "trunk attached" signal is then sent from circuit TC10 over the link and trunk TK to the operator at position OP. The operator then proceeds to seize the appearances A10 through circuit TC10 and to activate the sender link to connect a sender through circuit TC10, link PL and trunk TK to position OP.

At the time the sender is attached to circuit TC10 and is ready to receive the pulses representing the digits of the completing office code and called customer station, circuit TC10 notifies the operator to send them. This data is then pulsed forward over trunk TK through link PL, circuit TC10 and the sender link to registers in the sender.

Immediately following the registration of the called office code in the sender, the sender transfers this data as well as the equipment location of trunk TC10 on frame TLF to the marker through a marker connector (not shown) in a manner fully described in the aforementioned Breed et al. patent. As described in the latter patent, the marker is equipped with an office code translator which translates the called office code and supplies information required to complete call connections from appearance A10 through trunk link frame TLF, a junctor J, office link frame OLF and a trunk TK1 through the completing office CO to the called customer C1. When the marker has completed the foregoing circuit operations and others, which are not described herein because they are not necessary for an understanding of the invention, the marker is released. After the sender has received the last digit of a called customer number from operator position OP, it immediately operates to outpulse signals to the completing office CO for operating equipment (not shown) thereat to establish call connections from the outgoing trunk TK1 to the called customer station C1. The sender outpulses to the completing office CO via switching gear (not shown) in the sender link, circuit TC10, frame TLF, an interframe junctor J, frame OLF, and trunk TK1 to office CO. After transmitting the signals to completing office, the sender allows circuit TC10 to assume supervision over the called connections to station C1 until the conclusion of the call. The sender and sender link are then released. Ringing signals are then sent from completing office CO to the called station C1 in the conventional manner. When the called party answers, the operator may talk with that party and inform him of the service being rendered.

After the desired party at station C1 has been contacted, the operator may proceed to seize appearance B10 to originate a call to customer station C2 in a manner similar to that described with respect to the call between appearance A10 and station C1. During the time that the call is made to station C2, the appearances A10 and B10 are automatically interconnected by apparatus in circuit TC10 so that a talking path is available between stations C1 and C2 at the time the party at station C2 answers.

In the event that the operator ascertains that the desired party is not available at the called station C1 or C2 and is available at some other station, the operator may release the call connections between that customer station and the originating appearance of the trunk circuit C10 and effect the origination of another call to a different customer station, such as station C3 or C4, over the same appearance. The manner in which such a call is originated is essentially the same as that described with respect to the calls to stations C1 and C2.

When either called party terminates the call, apparatus in the trunk circuit TC10 is activated for transmitting signals indicative of the condition to operator position OP and allows the operator to depress a key and thereby effect the release of connections between the called stations.

DETAILED DESCRIPTION

*Connection of an operator position circuit to an idle trunk circuit*

Referring now to FIGS. 2, 3 and 4, an operator at position OP requests the connection of a trunk circuit to her position by activating the request key RE of FIG. 4 to apply ground through its contact 1 to lead ST for operating the allotter circuit AL of FIG. 4 and thereby effecting the selection of an idle trunk circuit. Each trunk circuit such as circuit TC1, in the same trunk group, such as group TG1, informs allotter AL that it is idle or busy by applying ground through contact 1 of relay TRK, such as relay TRK1 of FIG. 4 to the group busy lead GB, such as lead GB1, associated with the trunks of that group. Ground on a GB lead indicates that the associated trunk group has at least one idle trunk circuit. Allotter AL in response to the signals on the GB leads applies a ground to the lead ST, such as lead ST1, to a preferred group of trunk circuits. The first idle trunk circuit, such as circuit TC1, in the preferred group, such as group TG1, has its TRK relay released for extending ground from lead ST, such as lead ST1, through its contact 2 to activate the select magnet of a position link cross switch, such as magnet SM of FIG. 4, and the hunting circuit HC to find the requesting position. Circuit HC finds that, among the group of operator positions, position OP is requesting the service because the service request lead SR is grounded through contact 2 of key RE. Afterwards, circuit HC applies ground to the winding of the hold magnet H of the crossbar switch and thereby closes crosspoints 1 to 12 of the switch to interconnect the preferred idle trunk circuit, such as circuit TC1, and the requesting position OP. The operated magnet H closes its off-normal contact 1 to complete a locking path for itself through contact 1 of key PR of FIG. 4 to ground.

Figures 1, 5:
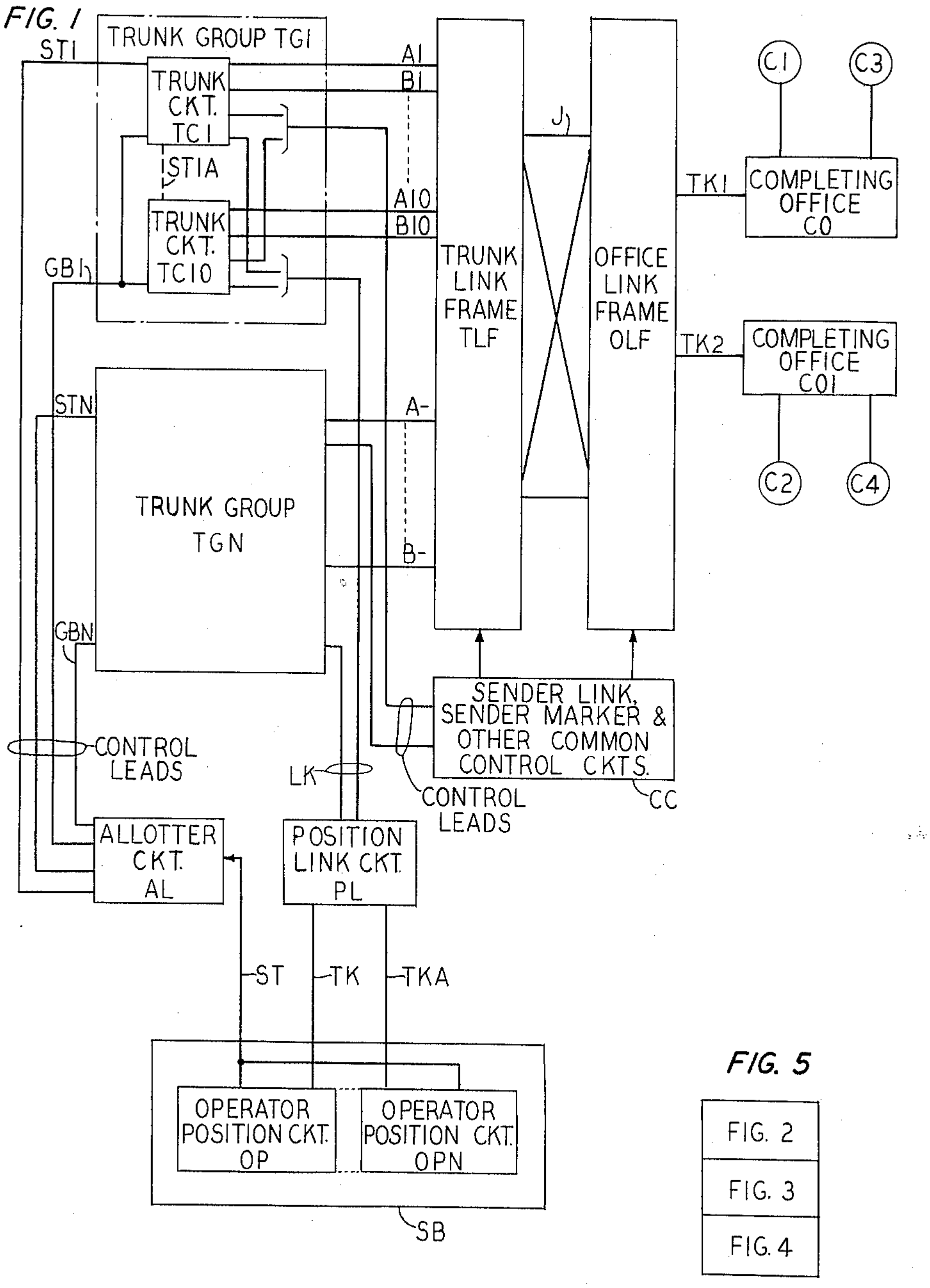
FIG. 1 shows, in block diagram form, the interrelation of the circuits of the exemplary embodiment.
FIG. 5 depicts the position in which FIGS. 2, 3 and 4 should be placed to show an operative arrangement.

To simplify the following description, it is assumed that circuit TC1 has been assigned to position OP and that the operator has been requested to originate calls between customer stations C1 and C2 of FIG. 1 from position OP. After the operation of crosspoints 1–12 of FIG. 4, ground is extended from position OP through contact 1 of the position release key PR, crosspoint 1 and the winding of the position-attached relay PA to the negative potential P1 to operate relay PA. Upon operating, relay PA closes its contact 1 to extend ground through the winding of relay TRK1, opens its contact 1 to remove ground from busy lead GB1 to allotter AL and transfer allotter start lead ST1 to ST1A through its contact 3 to the succeeding trunk circuit (not shown) in group TG1. Relay TRK1 also closes a locking path for itself through its contact 4 to ground supplied by allotter AL to lead H1. This ground holds relay TRK1 operated until all other trunk circuits (not shown) in group TG1 are used once. When the latter occurs, allotter AL advances its preference to a succeeding trunk group and relay TRK1 and its equivalents may be released.

The operation of crosspoints 2 and 3 also closes ground through contacts 1 of relays CSA and CSB and lamps L1 and L2 to the negative potentials P3 to light the lamps and notify the operator that she may originate the first call over appearance A1 or B1. In the following description, it is assumed that the operator uses appearance A1 to call station C1 and appearance B1 to call station C2, and that station C1 is the first one called.

*Call origination over appearance A1*

The operator initiates the call to station C1 by momentarily operating key RSA to apply a ground through its contact 1, crosspoint 4, contact 1 of relay DA1 and the winding of relay SRA of FIG. 4 to the negative potential P4 to operate relay SRA. Upon operating, relay SRA applies ground through its contact 1 and contact 1 of relay T to lead SST as a request for the connection of a sender through a sender link to trunk circuit TC1. When a sender is attached in a manner explained in the Breed et al. patent, ground is applied to lead CO through contact 2 of relay SRA and the winding of relay T to negative potential P5 for operating relay T which in turn closes its contact 2 to complete a locking path for itself to the ground on lead CO. After the sender is prepared to receive pulses representing the completing office code and customer station code, it applies negative potential (not shown) over lead PR through contact 2 of relay PA, contact 3 of relay T, winding of relay SA, and contacts 1 of relays RLA and RLB to ground (not shown) on lead PT for operating SA. Operated relay SA connects ground through its contact 1 and crosspoint 5 and the lamp L3 to potential P3 to light the lamp as a signal to the operator to release key RSA and start pulsing the customer directory number. Released key RSA opens its contact 1 to release relay SRA. Thereafter, the operator commences to key pulse the directory number of station C1 by means of a conventional key pulse transmitter KPT through crosspoints 6 and 7, capacitors A and B, leads PT and PR, and apparatus (not shown) in the sender link to registers (not shown) in the attached sender.

As is similarly explained beginning in column 18, paragraph 2 of the Breed et al. patent, after the sender has registered the code of completing office CO, it requests a marker and then supplies information required by the selected marker for establishing connections to an outgoing trunk, such as trunk TK1 of FIG. 1, to office CO. Upon determining the availability of the trunk TK1, the marker identifies the location of appearance A1 and tests for an idle channel between trunk TK1 and appearance A1. For identifying the location of appearance A1, the marker causes the sender to ground the sender link lead DC of FIG. 4 for operating relay FA of FIG. 3. The operate path extends from ground on lead DC through contact 1 of relay SB, contact 2 of relay DA1 and the winding of relay FA to negative potential P6. Operated relay FA closes its contact 1 to extend the ground on lead DC over the previously-described path further to lead LC to the trunk link frame TLF to mark the equipment location of appearance A1.

If the marker for any reason should thereafter fail to connect appearance A1 to trunk TK1, it extends ground over lead TRL of FIG. 3 through contact 2 of relay FA, contact 2 of relay SB and contact 2 of relay SA to lead D to advise the sender of this fact in a manner described in Breed et al. When relay FA operates, it also grounds lead M through its contact 3 to indicate the class of service of trunk circuit TC1 to the marker. Operated relay FA also closes its contact 4 to interconnect the sleeve leads S and SL of FIG. 3 for operating the crossbar switch select magnet (not shown) on the trunk link frame TLF associated with appearance A1. The marker supplies necessary ground to lead SL while setting up connections between trunk TK1 and appearance A1 via frames OLF and TLF and a junctor J of FIG. 1.

After the marker has interconnected and checked the channel between trunk TK1 and appearance A1, it supplies to the sender the information it requires for completing connections to station C1 and then effects the removal of ground from lead DC thereby to release relay FA. At the time relay FA releases, its contact 5 again closes for extending lead S through contact 3 of relay SB and contact 4 of relay T to ground for controlling the operation of the crossbar switch (not shown) associated with appearance A1 on frame TLF. The marker, after checking for this ground on lead S, signals the sender as disclosed in the Breed et al. patent to outpulse the digits required for completing connections from trunk TK1 to station C1. The marker then releases. When the sender has received the last digit of the called station code from the operator, it outpulses through the sender link leads FT and FR, contacts 4 and 5 of relay SB, leads TA and RA of appearance A1, apparatus (not shown) on frames TLF and OLF, a junctor J and trunk TK1 to office CO. The latter office then proceeds to interconnect trunk TK1 and station C1 and apply ringing signals to station C1.

As is similarly described beginning at column 119, last paragraph of the Breed et al. patent, the sender after completing outpulsing grounds sender link lead D for operating relay DA of FIG. 3. The operate path for relay DA extends from lead D through contact 2 of relay SA, contact 2 of relay SB, contact 6 of relay FA and the winding of relay DA to negative potential P7. When operated, relay DA closes its contact 1 to complete a locking path for itself through contact 2 of relay RLA and contact 3 of relay PA to ground and also operates relay DA1 of FIG. 3 over the path extending from ground through contact 2 of relay DA and the winding of relay DA1 to negative potential P8. Upon operating, relay DA also connects leads TA and RA through its contacts 3, 4 and 5 to the winding of relay CSA and thereby conditions the relay for detecting an answer signal received from station C1. Relay DA also closes its contact 6 in parallel with contact 3 of relay DA1 to apply ground through contact 5 of relay FA to lead S for controlling crossbar switches associated with appearance A1 on frame TLF. The operation of relay DA1 extends ground through contacts 5 of relay T, contact 4 of relay DA1, contact 1 of relay SB and lead DC to the sender via the sender link as a check signal that relays DA and DA1 are operated and appearance A1 has been connected through contacts 3 and 4 of relay DA to the operator telephone set OTS at position OP. In turn, the sender removes ground from lead CO to release and pass supervision over the established connections to trunk circuit TC1. Upon releasing, relay T also opens its contact 3 to release relay SA which in turn opens its contact 1 to extinguish lamp L3 at position OP.

Trunk circuit TC1 now awaits a called party answer signal which is a reversal of potentials (not shown) applied to leads TA and RA. When this reversal is received, the polarized relay CSA is operated over the previously traced path, and it opens its contact 1 to extinguish lamp L1 at position OP to notify the operator that the called party has answered. The operator may now activate the talk key TLK of FIG. 4 to connect the operator telephone set OTS through contacts 1 and 2 of key TLK, crosspoints 8 and 9, leads OT and OR and contact 4 of relay DA to appearance A1 and talks to the called party to inform him of the service being rendered.

*Call origination over appearance B1*

After the operator has contacted the desired party at station C1, she originates the call to station C2 by activating key RSB to close ground through its contact 1, crosspoint 10, contact 2 of relay RLB, contact 1 of relay DB1, contact 6 of relay T and the winding of relay SRB of FIG. 4 to the negative potential P9. Upon operating, relay SRB closes ground through its contact 1 and the winding of relay SB of FIG. 3 to potential P8 for operating relay SB. Operated relay SRB closes its contact 2 to apply ground through contact 1 of relay T to lead SST to request the connection of a sender to circuit TC1. As previously explained, when a sender is attached, it grounds lead CO to complete an operate path for relay T through contact 3 of relay SRB. Operated relay T then closes its contact 9 to complete a locking path for relay SB via contact 10 of relay SB.

Subsequently, when the sender is prepared for receiving the directory code of station C2, it operates relay SA of FIG. 4 which in turn lights lamp L3, as previously explained, to inform the operator to key pulse the code.

As described in the preceding section, after the code of completing office CO1 is received, the sender requests a marker to set up connections to an outgoing trunk, such as trunk TK2, to that office. At the time the marker is testing for an idle channel between appearance B1 and trunk TK2, it causes lead DC to be grounded for operating relay FB via contact 6 of relay SB and contact 6 of relay SB and contact 2 of relay DB1. Upon operating, relay FB closes its contact 1 to extend the ground from lead LC1 to activate apparatus (not shown) on frame TLF of FIG. 1 which causes the extension of ground back to the marker to notify it that a call is being originated over appearance B1. Operated relay FB also closes its contact 2 for allowing the marker to pass a signal from trouble lead TRL1 through contact 10 of relay SB, contact 2 of relay SA and lead D to the sender in case the marker is unable to interconnect appearance B1 and the selected trunk TK2. Relay FB also grounds lead M1 through its contact 3 for passing the class of service of trunk circuit TC1 to the marker. The operation of relay FB also closes its contact 4 to interconnect leads S1 and SL1 for operating the crossbar switch select magnet (not shown) associated with appearance B1 on frame TLF when the marker subsequently causes lead SL1 to be grounded as set forth in the Breed et al. patent.

When the marker has established a channel between trunk TK2 and appearance B1, it supplies information to the sender to allow it to complete the call and then causes the removal of ground from lead DC for releasing relay FB. Released relay FB, recloses its contact 5 for grounding lead S1 through contact 7 of relay SB and contact 4 of relay T to control the crossbar switches (not shown) associated with appearance B1. After checking for the ground on lead S1, the marker signals the sender to outpulse the digits required for completing the call to station C2, and then releases.

Upon receiving the last digit of the called station code from the operator, the sender outpulses through leads FT and FR, contacts 8 and 9 of relay SB, leads TB and RB, frame TLF, a junctor J, frame OLF, and trunk TK2 to office CO1 of FIG. 1. The latter office then interconnects trunk TK2 and station C2 and applies ringing signals to station C2. After outpulsing is completed, the sender grounds lead D for operating relay DB of FIG. 3 over the path through contact 2 of relay SA, contact 10 of relay SB and contact 4 of relay FB. Operated relay DB closes a locking path for itself through its contact 1, contact 3 of relay RLB and contact 3 of relay PA to ground. Relay DB also activates its contact 2 for operating relay DB1 of FIG. 3. Relay DB closes its contact 6 with contact 3 of relay DB1 for applying ground through contact 5 of relay FB to lead S1 to control crossbar switches (not shown) associated with appearance B1 on frame TLF. Upon operating, relay DB closes its contacts 3, 4 and 5 to connect leads TB and RB to the winding of relay CSB and to leads TA and RA of appearance A1 via the capacitors C and D and contacts 3, 4 and 5 of relay DA.

The operation of relay DB1 grounds lead DC via contact 5 of relay T, contact 4 of relay DB1 and contact 6 of relay SB to inform the sender that appearance B1 has been cut through and that the appearances A1 and B1 have been interconnected. The sender then removes ground from lead CO to release relay T which in turn opens its contact 9 to release relay SB, and also its contact 5 to remove ground from lead DC and thereby signal the sender to release itself and the sender link and pass supervision over the call connections to circuit TC1. Released relay T also opens its contact 3 to release relay SA which opens its contact 1 to extinguish lamp L3.

After the called party answers, potentials (not shown) applied to leads TB and RB are reversed for operating relay CSB. The latter relay then opens its contact 1 to extinguish lamp L2 at position OP. The operator may then converse with the party at station C2 and if desired parties have been contacted she permits communication between the called parties. Thereafter, the operator maintains control over the call connections and performs any functions required for charging and billing a customer for the service.

*Call encountering busy condition*

When an operator originates a call from either appearance A1 or B1 and encounters a called station busy condition, the potentials (not shown) applied in the tandem office to the leads of that appearance are alternately reversed to operate and release the associated supervisory relay CSA or CSB. As a consequence of this intermittent operation of relay CSA or CSB, ground pulses are applied through contact 1 of relay CSA or CSB to cause the flashing of lamp L1 or L2 at position OP to indicate the busy condition to the operator. The operator may then release the established connections from appearance A1 or B1 and originate a new call or release the trunk circuit TC1 and position link PL as hereinafter explained.

Likewise, if an all outgoing trunks busy condition is encountered in the tandem office, the sender will request the marker to set up connections between appearance A1 or B1 and an overflow trunk which returns a reorder tone or an announcement through circuit TC1 to the operator who then serves the call in the same manner as on a called station busy condition.

*Reringing a called station*

After a called station has answered and for some reason subsequently disconnected, the operator supervising the call may rering that station to recall the customer by operating the reringing key RSA or RSB of FIG. 4.

To rering station C1, the operator momentarily activates key RSA to close its contact 1 to connect ground through crosspoint 4, contact 5 of relay DA1 and the winding of relay RBA to potential P4 to operate relay RBA. Operated relay RBA activates relay RTA of FIG. 3 by closing a path through its contact 1 and the winding of relay RTA to potential P8. When the operator restores key RSA, its contact 1 is opened to release relay RBA and in turn relay RTA. Upon releasing, relay RBA closes a simplex path between leads TA and RA of appearance A1 through contacts 2 and 3 of relay RBA, contacts 1 and 2 of relay RTA and resistors F and G for applying the positive potential P11 through the thermal resistor H to appearance A1. This potential is applied thereto for a predetermined interval during the slow release of timing relay RTA and causes the reringing of station C1 in the usual manner. It will be noted that when relay RTA operated, it closed a shunt path through its contact 3 and resistor I to potential P8 for increasing its release time and thereby determine the period during which potential P11 is applied in simplex to appearance A1.

A reringing signal is sent to customer station C2 in a manner similar to that previously explained with respect to the reringing of station C1. The operator initiates the circuit action by momentarily operating key RB at position OP to apply ground through its contact 1, crosspoint 11 and the winding of relay RBB to potential P1 for operating relay RBB. Relay RBB closes a path through its contact 1 and the winding of relay RTB of FIG. 3 to potential P8 for operating relay RTB. After the momentary operation of key RB, its contact 1 is opened to release relay RBB which in turn releases relay RTB after a delay period. Upon releasing, relay RBB applies the positive potential P12 through thermal resistor J, resistors M and L, contacts 1 and 2 of relay RTB, contacts 2 and 3 of relay RBB to leads TB and RB of appearance B1. Relay RTB is a slow release device which upon operating closes a shunt path through its contact 3 and resistor I across its winding to increase its release time and thereby control the time that potential P12 is applied in simplex to appearance B1 for reringing the station C2.

*Releasing call connections from appearances A1 or B1 and originating a new call*

When an operator originates a call over appearance A1 or B1 to a customer station and all circuits to that station are found to be busy, or the desired party is unavailable or may be contacted at some other station, the operator may release connections extended from appearance A1 or B1 without releasing connections from the other appearance to a customer station. After releasing the call connections from the one appearance, a new call may be made by the operator over that appearance.

An operator initiates the release of connections from appearance A1 by momentarily activating key AR at position OP completing a circuit for operating relay RLA in circuit TC1. This circuit extends from negative potential P10 through contact 1 of key AR, crosspoint 12, contact 3 of relay RLA and contact 7 of relay DA or T to ground. Upon operating, relay RLA completes a locking path for itself through its contact 4 and thermal resistor Q to potential P9.

If the sender is yet attached to circuit TC1 and relay DA is not operated when relay RLA operates, relay RLA actuates its contact 1 to release relay SA and signal the sender to release itself as well as the other common control circuits CC, and connections are not established between appearance A1 and customer station C1. When the sender is releasing, as previously described, it effects the removal of ground from lead CO thereby to release relay T. Released relay T opens its contact 7 to release relay RLA. Another call may then be originated over appearance A1 by operating key RSA in a manner described in previous paragraphs.

On the other hand, if connections have been established from appearance A1 to completing office CO and the sender has already released when relay RLA operates, relay RLA opens its contact 2 to release relay DA. Upon releasing, relay DA opens its contact 7 for releasing relay RLA. Released relay DA actuates its contact 2 for releasing relay DA1. Relay DA also opens at its contacts 3, 4 and 5 the connection between leads TA and RA through relay CSA and thereby effects the release of relay CSA if it has not already been released by the disconnection of the customer, and the transmission of an on-hook signal to the completing office CO to effect the release of call connections between trunk TK1 and switching gear (not shown) in office CO. The combined release action of relays DA and DA1 opens at their contacts 6 and 3, respectively, to remove the supervisory holding ground on sleeve lead S to effect the release of the crossbar switch hold magnets (not shown) on the trunk and office link frames TLF and OLF and thereby the release of connections to appearance A1. The operator can then initiate a new call over appearance A1 by activating key RSA as previously explained.

The circuit action involved in releasing connections from appearance B1 is similar to that involved for releasing connections from appearance A1. An operator effects the release by momentarily operating key BR at position OP to extend potential P10 through contact 1 of key BR, crosspoint 10, contact 2 of relay RLB, contact 5 of relay DB1 or contact 1 of relay DB1 and contact 8 of relay T, and the winding of relay RLB to ground thereby operating relay RLB. Operated relay RLB closes a locking path for itself through its contact 4 and resistor Q to potential P9.

When a sender is attached to circuit TC1 and relay DB is not operated at the time relay RLB operates, relay RLB opens at its contact 1 the operate circuit for relay SA and thus signals the sender to release itself as well as other common control circuits and connections are not established from appearance B1 to station C2. At the time the sender is relasing, it removes ground from lead CO to release relay T. Upon releasing, relay T actuates its contact 8 to release relay RLB. A new call may then be originated over appearance B1 by activating key RSB as described previously.

However, if connections have been established from appearance B1 to completing office CO1 and the sender has released when relay RLB operates, relay RLB opens its contact 3 to release relay DB which in turn opens its contact 2 to release relay DB1. Released relay DB also opens its contacts 3, 4 and 5 for releasing relay CSB and sending an on-hook signal to the completing office CO1 to release call connections between trunk TK2 and switching apparatus (not shown) in office CO1. Upon releasing, relay DB1 opens its contact 5 to release relay RLB and thereby condition the circuit TC1 for the origination of a new call over appearance B1.

*Disconnect of call connections*

At the time the called party disconnects, an on-hook signal is applied to termination A1 or B1 to effect the release of relay CSA or CSB. The release of one of these relays causes lamp L1 or L2 to be energized to inform the operator at position OP of the disconnect condition. The operator may then proceed to activate momentarily the position release key PR to open its contact 1 and thereby release the hold magnet H and relay PA. The release of magnet H opens the crosspoints 1–12 and disconnects position OP from circuit TC1. Released relay PA opens its contact 3 to release relays DB and DA which in turn releases relays DB1 and DA1. Relays DB and DA upon releasing open their contacts 3, 4 and 5 to remove the holding bridge across appearances A1 and B1 and thereby effect the release of call connections to completing offices CO and CO1. Released relays DB and DA complete a path for discharging the charge on capacitors C and D. This path extends from capacitor C through contact 8 of relay DA, resistor N, capacitor D, resistor O and contact 7 of relay DB. Released relays DA1 and DB1 remove the holding grounds from leads S and S1 to release crossbar switch hold magnets (not shown) on the trunk and office link frames TLF and OLF and thus release connections to appearances A1 and B1. At the same time, relays DA1 and DB1 open at their contact 6 the locking path for relay TRK1 unless the allotter circuit is selecting idle trunks within the same group. In the latter situation, ground on the allotter lead H1 holds relay TRK1 operated until all trunk circuits in that group have been used by an operator position.

It is to be understood that the above-described arrangement is illustrative of the principles of the invention. Numerous other arrangements may be devised by those skilled in the art without departing from the spirit and scope of the invention.

What is claimed is:

1. In a switching system, a trunk circuit having a plurality of communication lines, operator position equipment including means for applying code signals to said circuit, control means responsive to the signals received from said circuit for supplying an individual group of control signals through said circuit to each of said lines, a plurality of communication stations, switching means controlled by said control means and responsive to the receipt of control signals from each of said lines for connecting each one of said lines individually to one of said stations, and means in said circuit interconnecting said lines to provide for communications between the stations connected thereto.

2. In a switching system in accordance with claim 1 the combination wherein said trunk circuit comprises first and second lines, said interconnecting means comprises means for interconnecting said first and second lines, means activated by said operator position equipment for steering an individual group of said control signals to each of said lines.

3. In a switching system in accordance with claim 2 the combination wherein each of said first and second lines comprises a pair of conductors, and said interconnecting means comprises an electrical coupling network and switch means activated by said control means for interconnecting said pairs of conductors through said network.

4. In a switching system in accordance with claim 3 the combination wherein said electrical coupling network comprises a pair of capacitors each having first and second terminals, and said switch means comprises a relay activated by said control means for connecting each one of said conductors of said first line individually to said first terminals of said capacitors and another relay activated by said control means for connecting each one of said conductors of said second line individually to said second terminals of said capacitors.

5. In a switching system in accordance with claim 4 the combination further comprising a trunk having a pair of conductors extending between said operator position equipment and said trunk circuit, and means in said circuit activated by one of said relays for connecting each of said trunk conductors individually to a conductor of said first line for providing communication between said equipment and said stations connected to said first and second lines.

6. In a switching system in accordance with claim 4 the combination wherein said trunk circuit further comprises supervisory means connectable to conductors of each line by said relays for maintaining established connections between each line and one of said stations, and means selectively activated by said operator position equipment for deactivating any one of said relays to disconnect said supervisory means from the associated line and thereby release connections between said last-mentioned line and one of said stations.

7. In a switching system in accordance with claim 6 the combination wherein said supervisory means comprises a polarized relay having a winding with a first terminal connected to one conductor of said first line and a second terminal connected to the other conductor of said first line and another polarized relay having a winding with a first terminal connected to one conductor of said second line and a second terminal connected to the other conductor of said second line.

8. In a switching system in accordance with claim 7 the combination further comprising means in said switching means for controlling the operation and release of each of said polarized relays after the associated line is connected to one of said stations, and wherein said trunk circuit further comprises signaling means including apparatus actuated by the operation of any one of said polarized relays for sending a signal to said operator position equipment to indicate the connection of a line to a station and apparatus actuated by the release of any one of said polarized relays for sending another signal to said equipment to indicate the disconnection of a station from one of said lines.

9. In a switching system in accordance with claim 4 the combination wherein said trunk circuit further comprises for each of said lines ringback means including a potential source, an impedance network, connector means activated by said operator position equipment for connecting said source through said impedance network to the associated line.

10. In a switching system in accordance with claim 9 the combination wherein said impedance network comprises a pair of resistors each having a first terminal connected to said potential source and a second terminal connectable to one of said conductors of the associated lines, and said connector means comprises timer apparatus for connecting each of said second terminals of said resistors to a conductor of the associated line for a timed period.

11. In a switching system in accordance with claim 10 the combination wherein said timer apparatus comprises a relay time delay arrangement.

12. In a telephone system, a switching network, a line switching circuit having first and second lines to said network, a trunk connected to said circuit, operator position equipment including means for applying groups of code signals over said trunk to said circuit, means activated over said trunk by said equipment for conditioning said circuit to make a telephone call over said first line, a first telephone station, control means responsive to the receipt of a first group of said code signals from said circuit for connecting said first line to said station, means activated over said trunk by said equipment for conditioning said circuit to make a telephone call over said second line, a second telephone station, said control means responsive to the receipt of a second group of said signals from said circuit for connecting said second line to said second station, and means in said circuit activated by said control means for interconnecting said lines.

13. In a telephone system in accordance with claim 12 the combination wherein said line switching circuit further comprises means for releasing connections between said first line and said first station, and means for subsequently reconditioning said circuit to make a telephone call from said first line while maintaining established connections between said second line and said second station.

14. In a telephone system in accordance with claim 13 the combination further comprising means in said line switching circuit controlled by said equipment for deactivating said interconnecting means upon the release of connections between said first line and said first station, a third telephone station, said control means responsive to a third group of code signals from said circuit for connecting said first line to said third station, and means in said control means for reactivating said interconnecting means to interconnect said first and second lines to provide for communication between said second and third stations.

15. In combination, a plurality of trunk circuits each having a plurality of terminations, operator position equipment including means for seizing any one of said circuits and means for activating the seized circuit to apply control signals to each of said terminations of said seized circuit, a plurality of telephone stations, switching means responsive to the receipt of control signals from said terminations of said seized circuit for connecting each of said last-mentioned terminations individually to one of said stations, and means in said seized circuit controlled by said equipment for interconnecting said terminations of said seized circuit.

16. In combination, a plurality of trunk circuits each having first and second terminations, operator position equipment, an allotter responsive to a signal from said equipment for assigning each of said circuits in sequence to said equipment, control means responsive to signals from said equipment for applying signals to the terminations of the trunk circuit assigned to said equipment, a plurality of communication stations, switching means responsive to the signals at said terminations of said trunk circuits from any one of said positions for assigning an idle one of said circuits to the requesting position, a position link activated by said allotter and said requesting position for connecting the assigned trunk circuit to the requesting position, control means responsive to signals received from said requesting position for supplying a pair of directing codes, means in said assigned circuit controllable from said requesting position for applying one of said pair of codes to the first termination of said assigned circuit, a communication station, means responsive to the receipt of said code from said first termination of said assigned circuit for connecting said last-mentioned termination to said station, means controllable from said requesting position for applying the second one of said codes to said second termination of said assigned circuit, a second communication station, means responsive to the receipt of said code from said second termination of said assigned circuit for connecting said last-mentioned termination to said second station, and means in said assigned circuit controlled by said requesting position for interconnecting said first and second terminations of said assigned circuit.

17. In combination, a plurality of trunk circuits, each having first and second terminations, a plurality of operator positions, an allotter activated by a request signal from any one of said positions for assigning an idle one of said circuits to the requesting position, a position link operated by said allotter and said requesting position for connecting an assigned trunk circuit to said requesting position, a plurality of communication stations, control means responsive to signals received from said requesting position through said position link and said assigned circuit for connecting each of said terminations individually to one of said stations, and means in said assigned circuit for interconnecting said terminations of said assigned circuit.

18. In combination, a plurality of trunk circuits, each having first and second terminations, a plurality of operator positions, an allotter activated by a request signal from any one of said positions for assigning an idle one of said circuits to the requesting position, a position link activated by said allotter and said requesting position for connecting the assigned trunk circuit to the requesting position, control means responsive to signals received from said requesting position for supplying a pair of directing codes, means in said assigned circuit controllable from said requesting position for applying one of said pair of codes to the first termination of said assigned circuit, a communication station, means responsive to the receipt of said code from said first termination of said assigned circuit for connecting said last-mentioned termination to said station, means controllable from said requesting position for applying the second one of said codes to said second termination of said assigned circuit, a second communication station, means responsive to the receipt of said code from said second termination of said assigned circuit for connecting said last-mentioned termination to to said second station, and means in said assigned circuit controlled by said requesting position for interconnecting said first and second terminations of said assigned circuit.

19. The combination in accordance with claim 18 wherein said assigned trunk circuit further comprises means activated by said interconnecting means for establishing means for establishing communication channels from said requesting operator position through said position link and said terminations of said assigned circuit to each of said communication stations.

20. The combination in accordance with claim 19 wherein said assigned circuit further comprises means activated by said requesting operator position for deactivating said interconnecting means to release connectons between said terminations of said assigned circuit and connections between said last-mentioned terminations and said communication stations connected thereto, and means at said requesting position for deactivating said position link to release connections between said assigned circuit and said requesting position.

21. In combination, a switching network, a trunk circuit having a plurality of terminations in said network, operator position equipment, means controlled by said equipment to connect each of said terminations via said network to a different called station, and means in said circuit interconnecting said terminations to provide for communication between said lines.

No references cited.

ROBERT H. ROSE, *Primary Examiner.*

WILLIAM C. COOPER, *Assistant Examiner.*

Disclaimer 3,248,486.—*Paul W. Wadsworth*, Massapequa Park, N.Y. LINE SWITCHING EQUIPMENT FOR SWITCHBOARDS. Patent dated Apr. 26, 1966. Disclaimer filed Sept. 28, 1966, by the assignee, *Bell Telephone Laboratories, Incorporated.*

Hereby enters this disclaimer as to claim 21 of said patent.

[*Official Gazette December 20, 1966.*]